INVENTOR
PETER MÜLLER

BY Percy P. Lantzy
ATTORNEY

INVENTOR
PETER MÜLLER

BY

ATTORNEY

United States Patent Office 3,424,900

Patented Jan. 28, 1969

3,424,900
CIRCUIT ARRANGEMENTS FOR STANDARDIZING GROUPS OF ANALOG SIGNALS

Peter Müller, Munich, Germany, assignor to International Telephone and Telegraph Corporation, Nutley, N.J., a corporation of Delaware Filed Mar. 30, 1965, Ser. No. 443,992
Claims priority, application Germany, Apr. 3, 1964, St 21,926
U.S. Cl. 235—193 3 Claims
Int. Cl. G06g 7/00

ABSTRACT OF THE DISCLOSURE

The present invention provides a general circuit arrangement with the aid of which the standardization may be carried out for a group of analog signals, independently of a special standardization requirement, and in addition thereto there are provided circuit arrangements for specific types of standardization requirements. The standardizing circuits may be used in connection with electronic analog and hybrid computers, in the fields of control engineering, in connection with an analog learning matrix, etc., and, generally, in all cases where analog signals occur which are independent of one another, and appear either simultaneously or successively, where standardization is required.

In data processing systems it is often a requisite that individual, independent signals within a group of analog signals, which are to be fed to a processing or storage device, be set in relation to some predetermined value; in other words, to standardize these groups of signals prior to their being fed into the processing or storage device. Contingent upon the particular application the standardizing condition may be expressed as a mathematical formula, with the aid of which the group of standardized signals may be derived from the group of independent analog signals.

No sophisticated prior art arrangements ae known for performing a standardization. In fact, hitherto the standardized values have been calculated, using brute force methods, from the given analog signals at a given standardizing condition (requirement), often with the aid of electronic computers.

As a case of practical application consider the standardization necessary for an analog translator which is capable of learning, i.e. a so-called analog learning matrix. This learning matrix consists of a matrix-shaped arrangement onto the column leads of which the signals to be leaned in, are applied as groups of analog signals (sets of signals assigned to certain properties), and to the rows of which a maximum detection circuit is connected. During the learning operation, the connecting elements at the cross or intersecting points of the matrix are adjusted in a rowwise fashion to the sets of signals assigned to certain properties, and during the confirming of learned phase, upon input of a set of signals assigned to certain properties, the signals coming from the cross or intersecting points (connecting elements) are summed-up in a rowwise fashion, and with the aid of a maximum detection circuit it is ascertained which row is equal or most alike the offered set of signals assigned to certain properties. These sets of signals assigned to certain properties must be standardized during the learning and confirming phase, because otherwise it is impossible to provide a recognition during the confirming or learned phase with the aid of the maximum detection circuit. The standardization conditions or requirements chosen in this particular example will be referred to hereinafter in connection with the description of the drawings.

The present invention relates to a circuit arrangement for the standardization of groups of analog signals in which the signals of one group are independent of one another, for the use with analog and hybrid computers, learning matrices, and the like. The invention is characterized in that between the individual sources of signals and the corresponding terminals of a processing device to which the signal groups are applied, there are connected identical switching circuits which are independent of one another, for changing the respective signal, with the electric properties thereof, either continuously or in a step-by-step manner; the signals being changed in accordance with the standardization requirement by a common device to which there are applied all input signals $a_i'$ and the standardization constant K, in such a way that the standardized signals $a_i$ may be taken off at the output of the said switching circuits.

In a particularly advantageous manner the standardization may be carried out by adding a value to, or by multiplying a value with the input signals.

The invention will now be explained in detail with reference to FIGS. 1 to 5*b* of the accompanying drawings, in which.

Figure 1:
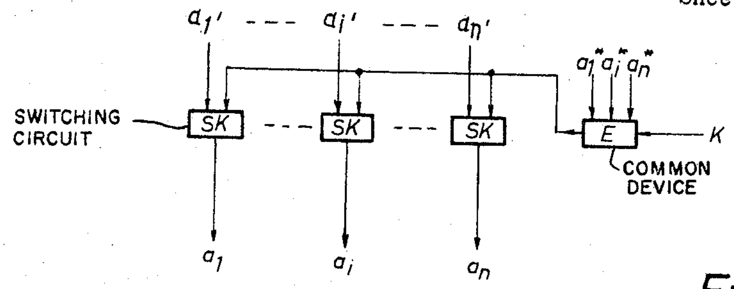
FIG. 1 shows a block diagram of the general standardization circuit.

In FIG. 1 the circuit arrangement for standardization of analog signals, is shown in its general form. The individual analog signal sources are indicated by $$a_1' \ldots a_i' \ldots a_n'$$

accordingly, there is a group of analog signals, or a set of signals assigned certain properties, in which the properties are analog signals. The analog signals appear preferably simultaneously, but also may appear successively. In the second case it is appropriate to provide intermediate storage devices. The individual signals are independent of one another. They are applied to the one input of switching circuits SK which are all alike, and are independent of one another. Moreover, a device E is provided at one input of which is applied the standardization constant K, and at the other inputs of which are applied the unchanged input signals or those which have already been changed in some way or other. The signals which are applied to the last-mentioned inputs, are indicated by $a_1^* \ldots a_i^* \ldots a_n^*$. The output of the device E is connected to the second inputs of all switching circuits SK. The standardization constant K is either applied from the outside, or is automatically determined by the subsequently following processing system. The device E affects the analog signals which are applied to the switching circuits SK, in such a way that the standardized signals $a_1 \ldots a_i \ldots a_n$ man each be taken off at the outputs of the switching circuits SK.

Accordingly, the arrangement according to FIG. 1 is capable of standardizing a group of *n* analog signals $a_i'$ which are fed in or applied via separate lines, in other words, of changing (modifying) them in such a way that the changed signals $a_i$ occurring at the output of the circuit arrangement, will satisfy a given standardization requirement. When applying successively several groups of analog signals to the arrangement according to FIG. 1 each group will be changed, in other words, standardized in accordance with the common standardization requirement.

The specific types of circuit arrangements described hereinafter are provided specially, but not exclusively, for analog learning matrices.

In the analog learning matrix each group of signals $a_1 \ldots a_i \ldots a_n$ of one row, must satisfy the following requirement:

$$\sum_{i=1}^{n} a_i^2 = K = \text{const.} \quad (1)$$

K is greater than zero and equal to all rows of an analog learning matrix; the value for K has been chosen in accordance with the employed type of maximum detection circuit.

The changing of the fed-in analog signals $a_i'$ may be effected, for example, either by adding a value $d_0$ or by multiplication with a value $e_0$. In this case, to all analog signals $a_i'$ of one row there is aded the same value $d_0$, or else all signals $a_i'$ of one row are multiplied with the same value $e_0$. The value $d_0$ or $e_0$ respectively, is different with respect to each row, and is determined in such a way that with respect to the changed signals the condition of Equation 1 is satisfied per row.

When effecting the standardization with the aid of addition, the value $d_0$ is added to each value $a_i'$ of one row, hence $$a_i' + d_0 = a_i \quad (2)$$

From Equation 1 it follows $$\sum_{i=1}^{n} (a_i' + d_0)^2 = K \quad (3)$$

From this results $$d_0 = -\frac{1}{n}\sum_{i=1}^{n} a_i' \pm \sqrt{\frac{1}{n}2\left(\sum_{i=1}^{n} a_i'\right)^2 + \frac{1}{n}\left(K - \sum_{i=1}^{n} a_i'^2\right)} \quad (4)$$

$d_0$ may assume positive as well as negative values.

FIGS. 2 to 5*b* show circuit arrangements in which the standardization is effected by way of addition.

Figure 2:
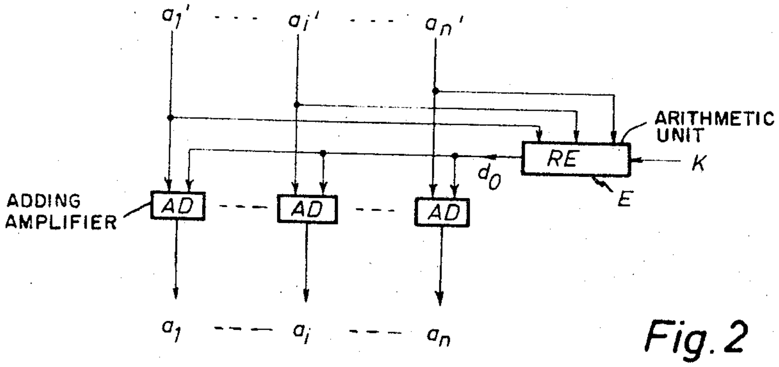
FIG. 2 shows a block diagram for effecting the standardization by way of addition.

In FIG. 2 the circuit parts corresponding to the switching circuits SK are either adding amplifiers or other types of summing (adding) devices AD. To these there are applied the input signals $a_i'$ as well as the changing signal $d_0$; the output signals are the sums of $a_i'$ and $d_0$, hence the standardized analog signals $a_1 \ldots a_i \ldots a_n$. The device E of FIG. 1 is designed as an arithmetic unit RE in which $d_0$ is computed from K and the signals $a_i'$ according to Equation 4. Since the inputs signals $a_i'$ are directly applied to the arithmetic unit RE, the signals $a_i'$ and $a_i^*$ are identical in this case. The arithmetic unit RE may be designed, for example, as a special type of computer.

Figure 3:
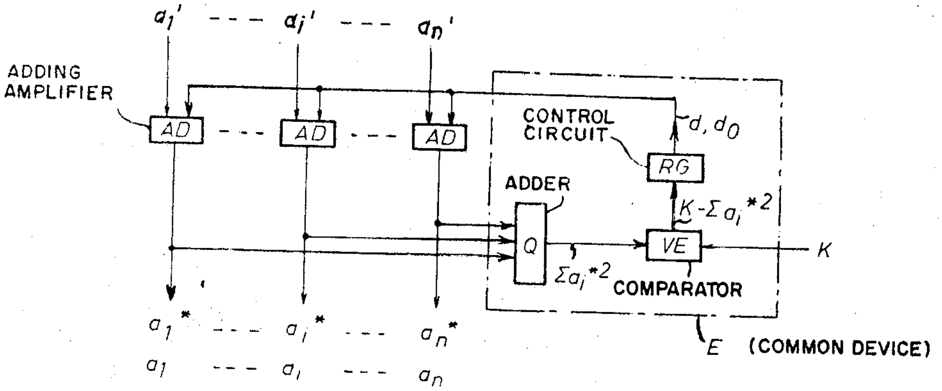
FIG. 3 shows another block diagram for effecting the standardization by way of addition.

In the arrangement according to FIG. 3 the common device E consists of an adder Q, of a comparator VE, and of a control circuit RG. The switching circuits are designed as adding amplifiers as in FIG. 2. In this case, the input signals $a_i'$ are not applied directly to the common device E, but are fed from the outputs of the adding amplifiers AD as changed signals $a_i^*$ to the adder Q of the common device E. Upon starting of a standardization process the adding amplifiers AD may be adjusted or set at will. The adder Q forms $$\sum_{i=1}^{n} a_i^{*2}$$

which is applied to one input of the comparator VE. To the other input of the comparator VE there is applied the standardization constant K, and this is aimed at forming the difference of K and $$\sum_{i=1}^{n} a_i^{*2}$$

This difference is applied to the control circuit RG for producing an output signal $d$ which is varied until (controlled by the comparator VE) $d$ assumes the specific value $d_0$, the standardization requirement of Equation 3 is thus satisfied.

Figure 5A:
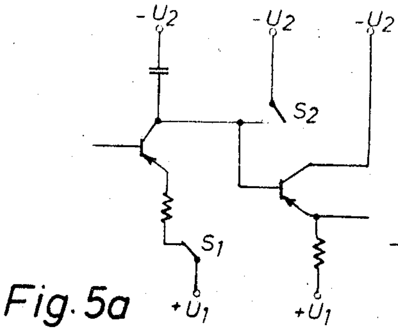
FIGS. 5*a* and 5*b* show an exemplary arrangement of the required control circuit and waveform thereof.
Figure 5B:
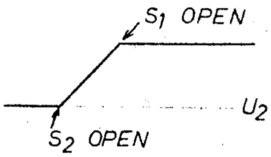

In an exemplary arrangement control circuit RG may be designed as a sawtooth generator (see FIG. 5*a*) which produces a linear increasing voltage ($d$). This voltage is applied to all adding ampifiers AD. During the rise portion of the sawtooh voltage, the signal $a_i^{*2}$ is continuously compared in the comparator VE with the standardization constant K. As soon as the output of VE becomes zero, the rising of the sawtooth voltage is interrupted by the opening of switch S1. In this manner the sawtooth voltage has reached the value $d_0$. In the circuit of FIG. 5*a*, the voltage rise commences upon the opening of switch S2 (see FIG. 5*b*).

The line conducting the changing signals $d$ or $d_0$ is connected to all ading amplifiers AD. The difference $$K - \sum_{i=1}^{n} a_i^{*2}$$

as formed in the comparator VE which, for example, may be a differential amplifier, will become zero when the control circuit produces the signal $d_0$. In that case the output signals $a_i^*$ of the adding amplifiers AD are the stanardized signals $a_i$.

Figure 4:
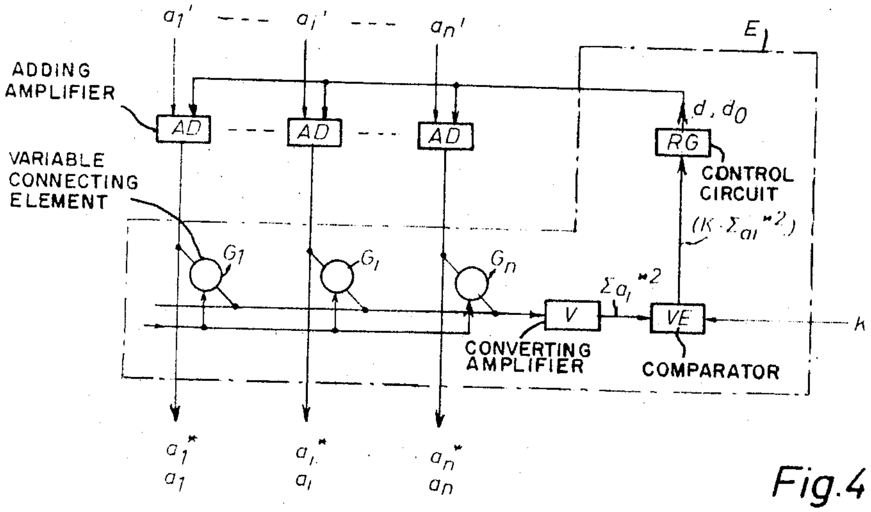
FIG. 4 shows a modification of the arrangement shown in FIG. 3, especially for use in an analog learning matrix.

According to the arrangement as shown in FIG. 4 it is also possible, for the purpose of determining the value $$\sum_{i=1}^{n} a_i^{*2}$$

to use one row of an analog learning matrix comprising $n$ cross or intersecting points, or a similar type of squaring circuit provided with $n$ variable connecting elements $G_1 \ldots G_i \ldots G_n$ in which the momentary signals $a_i^*$ are stored by correspondingly setting the variable quantity thereof (conductance, magnetization, etc.). Since the output signal of a cross-point is the product of the stored signal $a_i^*$ and the interrogating signal (likewise $a_i^*$), and since the output signals of the cross-points are added to one another, the signal $$\sum_{i=1}^{n} a_i^{*2}$$

will occur at the end of the row wire, with this signal, if necessary, having to be converted by the inserted amplifier V in such a way as to permit it to be compared in the comparator VE with the standardization constant K. Since for each new value $d$ there will resut a new value $a_i^*$, the latter must always be newly stored in the cross-points of the auxiliary row in order to obtain the sum of the squares of $a_i^*$.

When carrying out the standardization by way of multiplication, every value $a_i'$ of one row is multiplied with the vale $e_0$, hence $$e_0 \cdot a_i' = a_i \quad (5)$$

With the Equation 1 it follows from this with respect to $$e_0^2 = \frac{K}{\sum_{i=1}^{n} (a_i')2} \quad (6)$$

For realizing the standardization according to Equation 6 the arrangements according to FIGS 2 through 5*b* must be modified so that instead of the adding amplifier AD controllable amplifiers or similar multiplying arrangements are used. The remaining component groups of the arrangements remain the same with the exception of modifications due to the functioning.

The employed component groups for both kinds of standardization are known from the state of prior art; therefore, they are not particularly described herein.

I claim:

1. A circuit arrangement for the standardization of groups of analog signals in which the signals within a group are independent of one another, comprising:

a plurality of similar independent switching circuits each having first and second input connections and an output connection, the analog signals to be standardized being applied to said respective first input; and an arithmetic unit having a first input connection, a plurality of second input connections and an output connection, a standardization constant derived in accordance with the particular standardization requirement being applied to said first input, the analog signals to be standardized being applied to said second inputs with the output of said arithmetic unit coupled to said second inputs of said switching circuits, the standardized signals being taken off at the respective outputs of said switching circuits, the standardization being effected by adding a value to the input signals wherein said switching circuits are designed as adding amplifiers, and said arithmetic unit includes: an adder whose inputs are the outputs of said adding amplifiers (signals $a_i^*$) in which $$\sum_{i=1}^{n} a_i^{*2}$$

is formed, a comparator for the comparison of $$\sum_{i=1}^{n} a_i^{*2}$$

and of the standardization constant K, at the output of which occurs the difference between K and $$\sum_{i=1}^{n} a_i^{*2}$$

and a control circuit which, controlled by the output signal of the comparator supplies the changing signal for said adding amplifiers (AD), with the electrical properties of said adding amplifiers AD being changed in the positive and/or negative sense until the difference between K and $$\sum_{i=1}^{n} a_i^{*2}$$

equals zero.

2. An arrangement according to claim 1, wherein said adder is a row comprising $n$ cross-points with connecting elements thereat, the constitution of $$\sum_{i=1}^{n} a_i^{*2}$$

being formed in a first step as signal $a_i^*$ are stored into said connecting elements, and that in the course of a second step the connecting elements are interrogated with the same signals $a_i^*$ in a non-destructive manner, so that at the connecting elements there will result the products $a_i^{*2}$ and that with respect to the entire row there will result the sum of the products $a_i^{*2}$.

3. An arrangement according to claim 2 for use in an analog learning matrix comprising $m$ rows and $n$ columns, wherein the row for forming $$\sum_{i=1}^{n} a_i^{*2}$$

is the $(m+1)$st row of said analog learning matrix.

References Cited

UNITED STATES PATENTS

| | | | |
|---|---|---|---|
| 2,947,971 | 8/1960 | Glauberman et al. | 340—146.3 |
| 3,036,268 | 5/1962 | Smith | 340—146.3 X |
| 3,268,866 | 8/1966 | Van't Slot et al. | 340—166 X |
| 3,292,150 | 12/1966 | Wood | 235—193 X |

MALCOLM A. MORRISON, *Primary Examiner.*

J. F. RUGGIERO, *Assistant Examiner.*

U.S. Cl. X.R.

340—146.3